Figure 1:
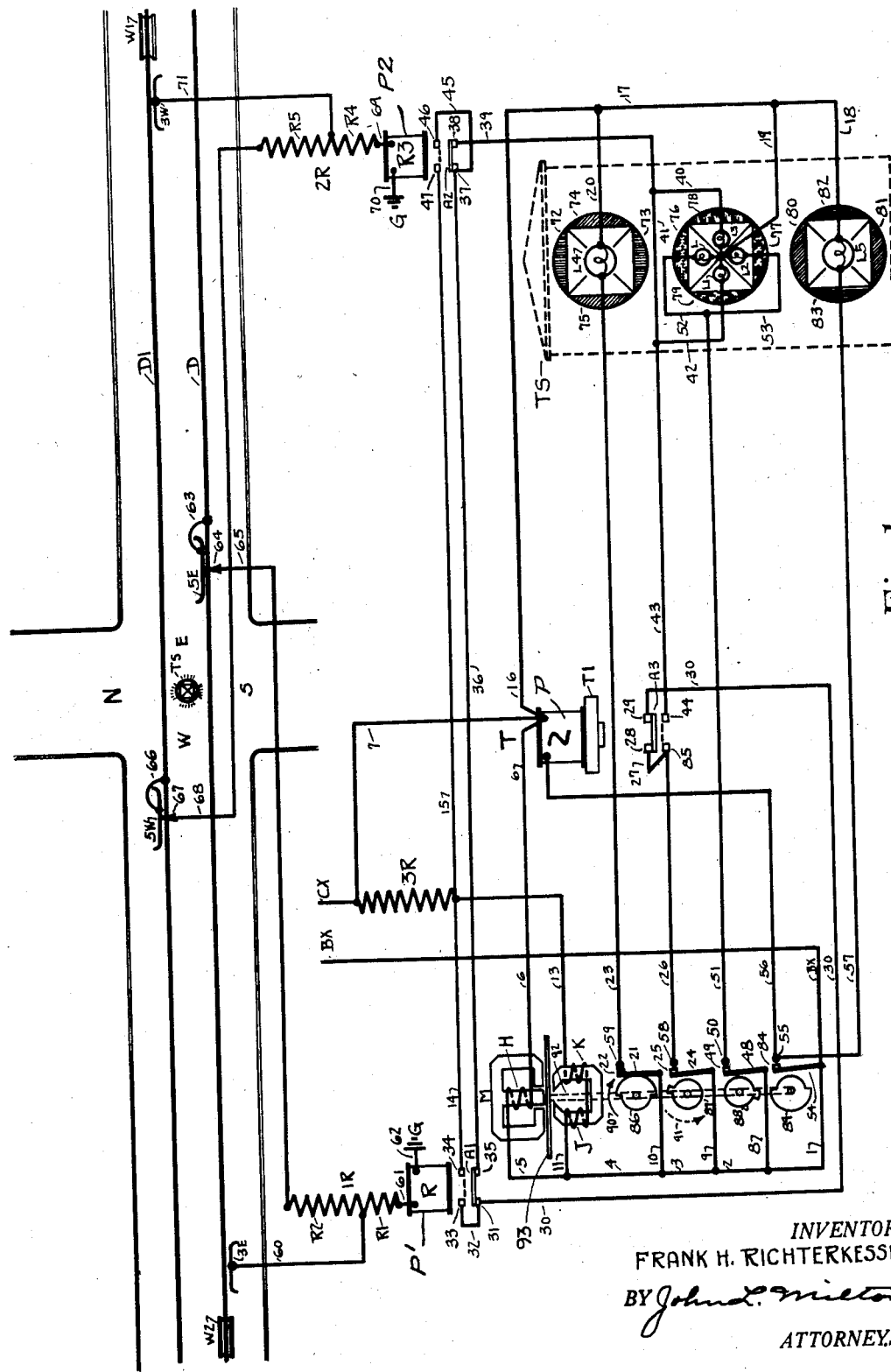

Patented May 16, 1933

1,909,316

UNITED STATES PATENT OFFICE

FRANK H. RICHTERKESSING, OF LOUISVILLE, KENTUCKY, ASSIGNOR TO NACHOD & UNITED STATES SIGNAL CO., INC., OF LOUISVILLE, KENTUCKY

TRAFFIC SIGNAL CONTROL SYSTEM

Application filed February 19, 1930. Serial No. 429,622.

My invention relates to the vehicular control of an automatic traffic signal, which is intended for use at the intersection of two thoroughfares.

The main object of my invention is to provide a system wherein the indications of a signal controlling intersecting traffic, are normally displayed periodically, but with the approach of an electric street car into a selected proximity with respect to the intersection, will cause the traffic signal to have a prolonged display of a green proceed indication to favor the preferential movement of the car, and retain a stop indication for the intersecting traffic until the car passes the intersection. The system is so arranged that the periodical control of the signal indications will be restored as soon as the car passes the intersection.

The purpose of such an arrangement is to permit a car to take control of the traffic signal for the direct purpose of permitting a continuous movement of a car by eliminating the necessity of having the car make unnecessary stops at the intersection where the traffic signal is located.

The system is so arranged that an auxiliary time element cutout will start to function the instant the desired proceed signal is displayed for the electric line traffic, to interrupt the prolonged display of the said indications after a predetermined time, and cause a reversal of the former prolonged display, wherein a stop indication will be displayed for the electric line traffic and a proceed indication for the intersecting traffic. After the indications have been reversed and displayed for a time equivalent to their normal period, the electric line proceed indications may subsequently be prolonged under the control of the moving car.

In the drawing accompanying my specification:

Figure 1 is a schematic drawing showing the electrical circuits of my system, and the location of the traffic signal at the intersection of the thoroughfares, and the location of the trolley contactors with respect to the said intersection.

My invention is intended primarily to be controlled by cars that are supplied with operating current by means of an overhead trolley wheel or current collector, mounted on a car by means of a trolley pole, although it may be controlled by vehicles which are operated by other methods. In Figure 1, the letters W1 and W2 represent traveling current collectors or contact making devices, to come into contact engagement with their respective trolley contactors. The current collector W1 operates westbound on the trolley wire D1, and the current collector W2 operates eastbound on the trolley wire D.

In the system shown in Figure 1, the letter D represents a trolley wire for the electric car movements eastbound. Positioned adjacent this trolley wire D, are trolley contactors 3E and 5E. The trolley contactor 3E is normally insulated therefrom, but is electrically connected thereto when the current collector W2 engages the trolley contactor. The trolley contactor 5E is of the normally closed type, that is, it is normally making contact engagement with the trolley wire D, through the connecting wire 63, but when the current collector W2 engages the contact strip of the trolley contactor 5E, the strip is deflected and removed out of contact engagement with its normally engaged contact 64. As soon, however, as the current collector W2 disengages the trolley contactor 5E the contact strip is restored into contact engagement with the normal engaged contact.

The letter D1 represents a trolley wire for the west bound electric car movements. Positioned adjacent this trolley wire D1, are trolley contactors 3W and 5W. The trolley contactor 3W is normally insulated therefrom, but is electrically connected thereto when the current collector W1 engages the trolley contactor. The trolley contactor 5W is of the normally closed type, and of the same character as the trolley contactor 5E mounted on the trolley wire D.

The trolley contactor 3E is mounted on the trolley wire D, and is placed within a selected proximity on the west approach side of the intersection, represented in the drawing by N, E, S, W. The trolley contactor 5E is mounted on the trolley wire D, and is placed on the far side of the said intersection. The trolley contactor 3W is mounted on the trolley wire D1, and is placed within a selected proximity on the east approach side of the intersection represented in the drawing by N, E, S, W. The trolley contactor 5W is mounted on the trolley wire D1, and is placed on the far side of the said intersection.

At the intersection the letters TS represent a traffic signal for periodically displaying stop, caution and proceed indications for the W, E electric line traffic and the intersecting N, S traffic.

I also employ electrically operated relays R and R3, that are under the control of the movement of a vehicle passing their respective controlling trolley contactors.

The relay R, that I employ, is provided with an operating coil P1 which is energized or deenergized to affect subsequent operations of the contact bridging bar A1. When the operating coil P1 of relay R is deenergized, the contact bridging bar A1 makes contact engagement with its respective back contacts 31 and 35. When the operating coil P1 of relay R is energized, the contact bridging bar A1 is removed out of contact engagement with its respective back contacts and is brought into contact engagement with its respective front contacts 33 and 34.

The relay R3, that I employ, is provided with an operating coil P2 which is energized or deenergized to affect subsequent operations of the contact bridging bar A2. When the operating coil P2 of relay R3 is deenergized, the contact bridging bar A2 makes contact engagement with its respective back contacts 37 and 38. When the operating coil P2 of relay R3 is energized, the contact bridging bar A2 is removed out of contact engagement with its respective back contacts and is brought into contact engagement with its respective front contacts 46 and 47.

I also employ in my system an auxiliary retarded release time element cutout relay T, that is influenced by the circuits established by the motor driven time element device controlling the periodical display of the stop, caution and proceed indications.

The purpose of this relay is to interrupt the prolonged control of the proceed indication for the W, E electric line traffic, and the stop indication for the N, S intersecting traffic, after a predetermined time, to cause a reversal in the display of the said indications, wherein a proceed indication will be displayed for the intersecting N, S traffic, and a stop indication for the W, E electric line traffic, should a car or any number of cars following closely, retain the control of the controlling relays to continue the prolongation in the display of the desired proceed indication for the W, E electric line traffic and retain the display of the stop indication for the N, S intersecting traffic. The circuits are so arranged that after the time element cutout functions, to produce the latter described reversal of indications, a following car cannot cause a continued prolongation of the green W, E electric line indication until after the motor driven time element device, controlling the periodical display of the traffic signal indications, passes through the necessary cycle to encounter a subsequent display of this indication.

The retarded release time element relay T is equipped with an operating coil P and a means for retarding the release of the relay represented by T1. The retarded release time factor of the time element relay T may be produced by many well known constructive principles of the art, primarily through the use of an oil dash-pot arrangement, or similiar construction employing an air diaphragm. The operating coil P of relay T controls the contact bridging bar A2, that makes contact engagement with its respective front contacts 28 and 29 when the coil P is energized, and after the coil P is deenergized until the time factor of the retarded release has functioned, wherein the contact bridging bar A3 disengages its respective front contacts and comes into contact engagement with its respective back contacts 44 and 85. When the coil P is initially energized, the contact bridging bar A3 instantaneously disengages its respective back contacts and comes into contact engagement with its respective front contacts. This relay is so arranged and designed, that the time interval will continue to operate as long as current is removed from the operating coil P, but will automatically restore itself to a normal starting position as soon as the current is applied to its operating coil.

I also employ in this system a motor driven time element device controlling the circuits for the periodical display of the stop, caution and proceed indications. The letter M represents a single phase alternating current induction motor and is equipped with a constant potential field coil H, and controlling field coils J and K. The motor M is equipped with a copper or aluminum disk 93, and the principle of the operation of such a motor is well known to those skilled in the art. The magnetic fields produced by the constant potential and controlling field coils, combined to form a rotating field; that is, the relation of these two fields for a complete cycle of one-quarter periods of the same, is approximately a ninety degree lag of one over the other. This continuous motion of the field induces eddy currents in the copper or aluminum disk 93, which react to produce a rotation of the disk in the same manner as in the rotor of an induction motor. Since the rotation of the disk produced by the rotary field, is a combination of the constant potential and controlling fields, it can be readily seen that the removal or reversal of one of the fields, namely the controlling field, would stop the disk or cause the disk to run in a reversed direction. In the system herein described and disclosed, I take advantage of this feature which plays an important part in the advancement of this art. It is well known to those skilled in the art, that while the motor M is in a running condition, if the coil terminals of the controlling field coils J and K were short circuited, the collapsing of the controlling field, and the rising of the constant potential field, would react in such a manner as to retard and practically instantly stop the rotation of the disk, but as the controlling field coils J and K are short circuited, they would act as a shading coil and their field and the constant potential field would react in such a manner as to produce a reversal in the former direction of the disk. The disk 93 drives the controller cam segments 86, 87, 88 and 89 through the shaft 92. With reference to the drawing, it can be clearly seen how the rotation of the cam segments in the direction of the arrow 90, produces subsequent opening and closing of the various contacts controlling the circuits of the signal indications, and it is not believed that a further explanation of how this is accomplished is necessary at this point, however a further detailed description is given hereinafter.

The dotted outline figure TS, is a symbolic representation of a traffic signal, housing three decks of signal indications, each deck comprising four indications, one of each to be displayed in one of the four directions at the intersection. In the upper deck, the red lenses 72 and 73 that face N and S on the intersection, and the green lenses 74 and 75 that face W and E on the electric line, each deck is provided with a common light source represented by L4. In the center deck, the four lenses 76, 77, 78 and 79 display an amber or caution indication and each is provided with an independent light source, the lens 76 facing the N intersecting traffic has a light source represented by L, the lens 77 facing the S intersecting traffic has a light source represented by L2, the lens 78 facing the E electric line traffic has a light source represented by L3, and the lens 79 facing the W electric line traffic is provided with a light source represented by L1. These indications are not displayed simultaneously, but are displayed at intervals that will be more clearly described in a later descripton. In the lower deck, the green lenses 80 and 81 that face N and S on the intersection, and the red lenses 82 and 83 that face W and E on the electric line, have a common light source represented by L5. For clarity of the description each of the three decks is shown in plan view, and this must be taken into consideration when the signal system is described so that the proper indications will be given for the proper directions.

The indications of the traffic signal are normally displaying periodically; that is, each signal indication is displayed for a certain predetermined time before the display of another signal indication occurs, all of which occurs in a definite sequence of a predetermined cycle. In the system three distinct indications are employed. For the proceed indication a green signal indication is employed. For the stop indication a red signal indication is employed. For the caution or traffic clearance indication an amber signal indication is employed. For the description of the sequence in which the said indications are displayed, we will start at an arbitrarily selected period of the cycle, wherein we have a display of a green signal indication in both directions for the W and E electric line traffic, and a displayal of a red signal indication in both directions for the N and S intersection traffic. The circuit for these indications are under the control of the cam 86 of the automatic motor driven time element device and is completed from the positive side of the line BX through wire 1, wire 2, wire 3, wire 10, through the contact arm 21 of the motor driven time element device, through the contact 22 of the contact arm 21, through the stationary contact arm 59, through wire 23, signal lamp L4, which is the light source for the four latter mentioned indications, wire 20, wire 16, wire 7 to the common return of the line CX. With reference to the drawing, it will be seen that these indications will continue to be displayed until the cam segment 86 permits the contact arm 21 to disengage the contacts 22 and 59, which is, for one-half of the total cycle. It will also be noted, that just as the cam segment 86 nears the end of its period, the cam segment 87 embraces the contact arm 24 of the motor driven time element device, and the contacts 25 and 58 are brought into contact engagement, which results in the displayal of an amber caution indication to warn the moving W, E electric line traffic that a change is about to be made in the display of the signal indications. It will be noted that the amber caution indication is given only to the traffic that is in motion, and is given with the indication of the green proceed signal. The circuit for the display of the amber caution signal indication for the moving W, E electric line traffic is completed from the positive side of the line BX, through wire 1, wire 2, wire 9, through the contact arm 24 of the motor driven time element device, through the contact 25 of the contact arm 24, through the stationary contact 58, wire 26, wire 27, front contact 28 of relay T, contact bridging bar A3 of relay T, front contact 29 of relay T, wire 30, back contact 31 of relay R, contact bridging bar A1 of relay R, back contact 35 of relay R, wire 36, back contact 37 of relay R3, through the contact bridging bar A2 of relay R3, back contact 38 of relay R3, wire 39, wire 40 to the signal lamp L3 which is the light source for the amber caution signal indication facing the E electric line traffic, also from the wire 39 to the wire 41, through the wire 41, through wire 42, to the signal lamp L1, which is the light source for the amber caution signal indication facing the W electric line traffic, through the common connecting wire 19, wire 17, wire 16, wire 7 to the common return of the line CX. The cam segments 86 and 87 disengage their respective contact arms simultaneously, and incident to this operation the cam segment 89 embraces the contact arm 54 of the motor driven time element device, and the contacts 84 and 55 are brought into contact engagement. These operations resulted in the former described indications going to darkness and the displayal of a red signal indication in both directions for the W, E electric line traffic, and a green signal indication in both directions for the N, S intersecting traffic. The display of the former indications resulted in the moving traffic coming to a stop, and the traffic that was at stop to be permitted to proceed. The circuit for the latter mentioned indications having been completed from the positive side of the line BX through the contact arm 54 of the motor driven time element device, through the contact 84 of the contact arm 54, through the stationary contact 55, wire 57, through the signal lamp L5, which is the light source for the four indications, wire 18, wire 17, wire 16, wire 7 to the common return of the line CX. With reference to the drawing, it will be noted that these indications will continue to be displayed until the cam segment 89 permits the contact arm 54 to disengage the contacts 84 and 55, which is, for one-half of the total cycle. It will also be noted, that just as the cam segment 89 nears the end of its period, the cam segment 88 embraces the contact arm 48 of the motor driven time element device, and the contacts 49 and 50 are brought into contact engagement, wherein an amber caution signal indication is displayed to warn the moving intersecting traffic that a change is about to be made in the display of the signal indications. This indication is given to the moving N, S intersecting traffic only, and is given with the green proceed signal indication. The circuit for the display of the amber caution signal indication for the moving N, S intersecting traffic having been completed from the positive side of the line BX, through wire 1, wire 8, contact arm 48 of the motor driven time element device, through the contact 49 of the contact arm 48, through the stationary contact 50, wire 51, wire 52, to the signal lamp L, which is the light source for the amber caution signal indication facing the N intersecting traffic, also from the wire 51 to the wire 53, through the wire 53 to the signal lamp L2, which is the light source for the amber caution signal indication facing the S intersecting traffic, through the common connecting wire 19, wire 17, wire 16, wire 7 to the common return of the line CX. The cam segments 88 and 89 disengage their respective contact arms simultaneously, and incident to this operation the cam segment 86 embraces the contact arm 21 of the motor driven time element device. The embracement of the cam segment 86 and the contact arm 21 resulted in the contacts 22 and 59 being brought into contact engagement. The contact engagement of the contacts 22 and 59 resulted in restoring the system to the arbitrarily selected starting point, and it can be seen that the signal indications will be continuously displayed in the same sequence as just described.

In the description of the car control of the traffic signal indication we will take into consideration a car moving eastbound with its current collector W2 on the trolley wire D. I do not believe that a detailed description of the car control of a traffic signal indication is necessary for a car moving westbound with its current collector W1 on the trolley wire D1, as it is very evident to those skilled in the art that the description of this control would be a repetition of that described for the eastbound control.

When the current collector W2 of an eastbound car engages the trolley contact 3E, the contactor will be electrically connected and of the same potential as the trolley wire, and the coil P1 of relay R will be sufficiently energized to effect an operation of the contact bridging bar A1 of relay R. At this point it would be well to note the requirements of relay R. Normally there is a very feeble current flowing through the operating coil P1 of relay R, flowing through a relatively high resistance circuit and being completed from the normally closed trolley contactor 5E. This current will not energize the operating coil P1 of relay R to the point wherein it would effect an operation of its contact bridging bar A1, but if the contact bridging bar A1 is initially raised through a sufficient energization of the operating coil P1 of relay R, the feeble current will sufficiently energize the operating coil P1 of relay R to a point wherein it would retain the raised position of the contact bridging bar A1 until this circuit was opened to permit the contact bridging bar A1 of relay R to release. The circuit for the initial energization of the operating coil P1 of relay R, wherein the contact bridging bar A1 of relay R disengaged its respective back contacts 31 and 35 and came into contact engagement with its respective front contacts 33 and 34, are completed from the trolley wire D, through the current collector W2, through the contact strip of the trolley contactor 3E, wire 60, through the low resistance portion R1 of the resistor 1R, wire 61, coil P1, wire 62 to the ground G. The holding circuit that retained the raised position of the contact bridging bar A1, having been completed from the trolley wire D, through wire 63, through the contact strip of the trolley contactor 5E, through the normally engaged contact 64 of the trolley contactor 5E, wire 65, through the resistance unit 1R, wire 61, operating coil P1 of relay R, wire 62 to the ground G. The disengagement of the contact bridging bar A1 of relay R with its respective back contacts 31 and 35, resulted in the opening of the amber caution signal indication circuit for the W, E electric line traffic that was completed through them. This operation did not affect the display of these signal indications, unless the electric line caution signal indications were displaying, or not until the automatic motor driven time element device passed through the necessary cycle to establish this circuit. At this point it will be well to note the circuit of the motor M of the motor driven time element device. The constant potential field coil H of the motor M is connected directly across the line, this circuit having been completed from the positive side of the line BX, through wire 1, wire 2, wire 3, wire 4, wire 5, through the field coil H of the motor M, wire 6, wire 7, to the common return of the line CX. The controlling field coils J and K of the motor M are connected in series, and are placed in series with a resistor 3R, and connected across the line. This circuit having been completed from the positive side of the line BX, through wire 1, wire 2, wire 3, wire 4, wire 11, through the field coil J, through the field coil K, wire 13, resistance unit 3R to the common return of the line CX. After the automatic motor driven time element device passed through the necessary cycle and encountered the display of a green proceed signal indication for the W, E electric line traffic and a red stop signal indication for the N, S intersecting traffic, the signal indications continued to be displayed under the influence of the automatic motor driven time element device until the cam segment 87 embraced the contact arm 24 of the motor driven time element device and brought the contacts 25 and 58 into contact engagement to display the amber caution signal indications for the moving W, E electric line traffic. As soon as the contacts closed, however, the caution signal indications were not displayed, as the circuit was opened through the disengagement of the contact bridging bar A1 of relay R with its respective back contacts and since the contact bridging bar A1 is now in contact engagement with its respective front contacts, the closure of the contacts 25 and 58 at the automatic motor driven time element device, resulted in a short circuit of the controlling field coils J and K of the motor M through the resistance unit 3R. The closure of the contacts 25 and 58 of the motor driven time element device resulted in placing positive BX on the controlling field coil K, and as the other controlling field coil J, which is in series with the field coil K, is constantly connected to the same source, no current will flow in the controlling field coil circuit and as heretofore described, the motor reverses its direction as shown by the arrow 91, that is, it will continue to oscillate at this point, running forwards and backwards, opening and closing the contacts 25 and 58 on the motor driven time element device controlling this circuit. This circuit is under the control of the cam segment 87 of the motor driven time element device, and was completed from the positive side of the line BX, through wire 1, wire 2, wire 9, contact arm 24 of the motor driven time element device, through the contact 25 of the contact arm 24, through the stationary contact 58, wire 26, wire 27, front contact 28 of relay T, contact bridging bar A3 of relay T, through the front contact 29 of relay T, wire 30, wire 32, front contact 33 of relay R, through the contact bridging bar A1 of relay R, front contact 34 of relay R, wire 14, resistance unit 3R to the common return of the line CX. The reversing of the motor's direction resulted in an opening of the contacts 25 and 58 controlling this shunt circuit, permitting the motor to run forward until the contacts were again closed. It can be seen that this condition will continue as long as the shunt circuit is established in this manner to retain the display of a green signal indication in both directions for the W, E electric line traffic, and a red signal indication in both directions for the N, S intersecting traffic. The purpose of having the motor reverse its direction is, to always insure a complete display of the caution signal indication when the periodical control is restored. An appreciable time period is involved in bringing the motor disk 93 to stop, and as this time is absorbed in the W, E electric line caution signal indication period, after the contacts controlling this circuit are closed, and since the total time for this signal display is very short, it can be seen that any time subtracted from it would be very noticeable, and since this time is variable would defeat its designated purpose. Therefore, by stopping and reversing the motor, as described and employed in this system, irrespective of where the motor is stopped or caused to be stopped by the application of a shunt under the control of the caution signal indication contacts, a full caution signal indication display will be rendered when the system is restored to its periodical control.

At this point it would be well to refer to the circuits controlling the normally energized retarded release time element relay T, referred to previously in the specification. It is the purpose of this relay, after a predetermined time, to restore the control of the traffic signal indications to normal, that is, under the influence of the cyclically operated motor driven time element device. In normal operation the time period of the relay T is adjusted to the maximum time the display of the railway green indication is to be displayed at any one time. The time of the relay would therefore be a time greater than the normal display of the railway green indication. With further reference to Fig. 1 it will be noted that the operating coil P of relay T is energized as long as the railway red indication is displayed. The circuit for the energization of the operating coil P is completed from the positive side of the line BX, through the contact arm 54 of the motor driven time element device, through the contact 84, contact 55, wire 56, operating coil P, wire 7 to the common return of the line CX. It will also be noted that the contact arm 54 controlling the contacts 84 and 55 is under the control of the cam 89 of the motor driven time element device. As soon as the contacts 84 and 55 are disengaged, the circuit mentioned for the energization of the operating coil P will be opened, and the contact bridging bar A3 of the retarded release time element relay T, will release under the influence of the retarded release time element factor of the relay. If the current collector W2 has engaged the trolley contactor 3E in the manner previously described, wherein the relay R was energized to effect the control of the railway green signal indications, the time element relay T will continue to operate in the manner just described, to restore the control of the signal indications to the cyclic display, should the current collector for some reason not clear the intersection in the predetermined time designated for this purpose. When the current collector is delayed in its course of travel, the contact bridging bar A3 of the time element relay T will disengage its normally engaged front contacts 28 and 29 and come into contact engagement with its normally disengaged back contacts 85 and 44. The disengagement of the front contacts 28 and 29 will open the circuit shunting the controlling field coils J and K of the motor M, and will immediately close a circuit for the display of the railway caution signal indication, through the contact engagement of the back contacts 85 and 44. The removal of the shunt on the operating field coils J and K, will enable the operating motor M to return to its normal operating condition, and the cam 87 of the motor driven time element device will complete its normal engagement with the contact arm 24, governing the display of the railway caution indication. The restoration of the motor driven time element device to its normal cyclic control will cause the cams 86 and 87 to disengage their respective contact arms, and the cam 89 to be brought into engagement with the contact arm 54. The operation of the cam segments in this sequence will result in the prolonged railway green indication being removed, and a red WE electric line indication and a green indication for the intersecting NS traffic being displayed in the same manner as was described for the normal operation of the periodic control, however, if the contact bridging bar A1 of relay R remained in its energized position, engaging its front contacts 33 and 34, the electric line proceed indication would be repeatedly displayed for a maximum predetermined time governed by the operation of the relay T until the contact bridging bar A1 was restored to its normal position.

After the traveling current collector W2 completes its course of travel and clears the intersection N, E, S, W, it will come into engagement with the contact strip 5E of the clearing trolley contactor mounted on the far side of the intersection. The engagement of the current collector W2 with the contact strip 5E, will result in the holding circuit of the operating coil P1 of relay R (completed through the contact 64 and strip 5E) being opened. The opening of this circuit will result in the contact bridging bar A1 being restored to its normal position. The restoration of the contact bridging bar A1 to its normal position will result in the shunting circuit for the controlling field coils J and K, completed through the front contacts 33 and 34 of relay R, being opened thereby enabling the motor M, controlling the cam segments of the motor driven time element device, to return to its normal cyclic operation. As soon as the contact bridging bar A1 of relay R engages its respective back contacts 31 and 35, an immediate display of the electric line caution signal indication will be completed, governed by the engagement of the cam 87 with its contact arm 24. This circuit will be completed from the positive side of the line BX through wire 1, wire 2, wire 9, contact arm 24, contact 25, contact 58, wire 26, wire 27, front contact 28 of relay T, contact bridging for A3 of relay T, front contact 29 of relay T, wire 30, back contact 31 of relay R, contact bridging bar A1 of relay R, back contact 35 of relay R, wire 36, back contact 37 of relay R3, contact bridging bar A2 of relay R3, back contact 38 of relay R3, wire 39, wire 40, caution signal lamp L3, to the common return of the line CX through wires 19, 17, 16 and 7. It will be noted that the wire 39 also fed a branch circuit through wire 41, wire 42, signal lamp L1 to the common return of the line CX, through the connecting wires 19, 17, 16 and 7. The restoration of the relay R to its normal condition will enable the indications of the traffic signal TS to be cyclically displayed as heretofore described, until a following car would take control of the automatic motor driven time element device in the same manner just described.

It would be well to note that in this system the periodic control of the signal indications is disturbed only when the running time from the trolley contactor 3E to the trolley contactor 5E is greater than the normal period of the proceed signal for the W, E electric line traffic, or dependent upon what period of the display the car passed the trolley contactor 3E. In any event the car will take control of the signal for an added time necessary to permit its passage over the intersection, wherein the traffic signal will immediately display an amber caution indication and then display a red stop indication for the electric line traffic and a green proceed indication to the intersecting traffic, under the influence of the automatic motor driven time element device.

It is obvious to those skilled in the art that although the system shown and described in the drawing and specification is for a double track location, that the system is applicable to a single track system.

There are, of course, modifications and arrangements of the parts and circuits which may be made from those shown in the above disclosure which will still fall within the scope of my invention.

I claim:—

1. A right-of-way indicating device for intersecting main and cross thoroughfares; controller means for normally periodically shifting the right-of-way indication from one thoroughfare to the other; means to arrest the operation of the controller so as to maintain the right-of-way indication on the main thoroughfare; and means including a vehicular actuated device on the main thoroughfare to operate the controller arresting means to retain the right of way indication on the main thoroughfare; means activated when the said right-of-way indication is shifted to the said cross thoroughfare and operable a predetermined time after the said right of way indication has shifted to the main thoroughfare, to re-establish the periodic control of the right-of-way indication by the said controller when the said arresting means has functioned and retained the said right of way indication on the main highway.

2. In a traffic signaling system arranged at the intersection of a main highway and a cross road for regulating traffic, the system comprising a plurality of signal circuits, said circuits including a "stop" signal for each of said highways and a "go" signal for each of said highways, a normally active time controlled selective switch mechanism included in the said circuits for alternately opening and closing same cyclically, means actuated by a vehicle approaching the intersection on the main highway to arrest the control of the said selective switch mechanism and to retain the said main highway "go" signal energized, and a second time control means, ineffective during the display of the "stop" signal to the main highway and operable to destroy the efficacy of the said vehicle actuated means when the said main highway "go" signal is energized for a predetermined time after the extinction of the display of said last "stop" signal.

3. In a traffic signaling system arranged at the intersection of a main highway and a crossroad for regulating traffic, the system comprising a plurality of signal circuits, said circuits including a "stop" signal for each of said highways and a "go" signal for each of said highways, a time control selective switch means normally connected to the said circuits for alternately opening and closing same cyclically, vehicular actuated means for rendering the said time controlled selective switch means temporarily inactive and to retain the said "go" signal for the main highway, and a second time control means, ineffective during the display of the "stop" signal to the main highway and operable to destroy the efficacy of the said vehicular actuated means for one complete cycle a predetermined time after the said main highway "go" signal is retained energized through the arresting of the said selective switch means after the extinction of the display of the said last "stop" signal.

4. In a traffic signaling system arranged at the intersection of a main highway and a crossroad for regulating traffic, the system comprising a plurality of signal circuits, said circuits including a "stop" signal for each of said highways and a "go" signal for each of said highways, a time control selective switch means normally associated with the said circuits for alternately opening and closing same cyclically, vehicular actuated means for rendering the said time controlled selective switch means temporarily inactive and to retain the said "go" signal for the main highway, and a second time control means, ineffective during the display of the "stop" signal to the main highway and actuated to an initial operating position when the said main highway "stop" signal is energized and operable to destroy the efficacy of the said vehicular actuated means for one complete cycle a predetermined time after the said selective switch has been rendered inactive after the extinction of the display of the said last "stop" signal.

5. In a traffic signaling system arranged at the intersection of a main highway and a crossroad for regulating traffic, the combination of a visual signal comprising a plurality of signal indications, including a proceed indication, a caution indication and a stop indication, electric circuts therefor, a time controlled selective switching means normally associated with the said circuits for alternately opening and closing same cyclically, a trolley contactor to be engaged by a car approaching the intersection, a relay equipped with an armature engaging contacts to complete a circuit from the said switching means to the main highway caution signal indication when in one position and to engage other contacts to establish another circuit to arrest the control of the said switching means when in another position to retain the display of the said main highway proceed indication, and a second relay equipped with a retarded release time element means, an operating coil and an armature therefor, said operating coil being energized only when the main highway stop indication is displayed, the armature of the said second relay being normally held in one position by the said operating coil and retarding means to close contacts completing the circuit to the contacts of the first mentioned relay and operable under the influence of the said retarding means a predetermined time after the display of the said main highway proceed indication to destroy the efficacy of the first said relay.

6. A right-of-way indicating device for interfering traffic lanes; controller means for normally periodically shifting the right-of-way indication from one traffic lane to the other; means to arrest the operation of the controller so as to maintain the right-of-way indication on one of the said traffic lanes; and means including a vehicular actuated device on the last said traffic lane to operate the controller arresting means to retain the right-of-way indication on the last said traffic lane; means activated when the said right-of-way indication is shifted to the other said traffic lane and operable a predetermined time after the said right-of-way indication has been shifted to the first named traffic lane, to reestablish the periodic control of the right-of-way indication by the said controller when the said arresting means has functioned and retained the said right-of-way indication on the first named traffic lane.

7. In a traffic signaling system for regulating traffic on interfering traffic lanes, the combination of a visual signal comprising a plurality of signal indications, including a proceed indication, a caution indication and a stop indication, electric circuits therefor, a time controlled selective switching means normally associated with the said circuits for alternately opening and closing same cyclically, a trolley contactor to be engaged by a car approaching the interference point on one of the traffic lanes, a relay equipped with an armature engaging contacts to complete a circuit from the said switching means to the caution indication for the last named traffic lane when in one position and to engage other contacts to establish another circuit to arrest the control of the said switching means when in another position to retain the display of the said proceed indication on the last named traffic lane, and a second relay provided with a retarded release time element means, an operating coil and an armature therefor, said operating coil being energized only when the stop indication for the last named traffic lane is displayed, the armature of the said second relay being normally held in one position by the said operating coil and retarding means to close contacts completing the circuit to the contacts of the first mentioned relay and operable under the influence of the said retarding means a predetermined time after the display of the said proceed indication to the last named traffic lane to destroy the efficacy of the first said relay.

In testimony whereof I affix my signature.

FRANK H. RICHTERKESSING.